A. G. GIRARD.
ADJUSTABLE SUSPENDING RIG FOR AUTOMOBILES.
APPLICATION FILED MAR. 13, 1922.
1,416,191.
Patented May 16, 1922.
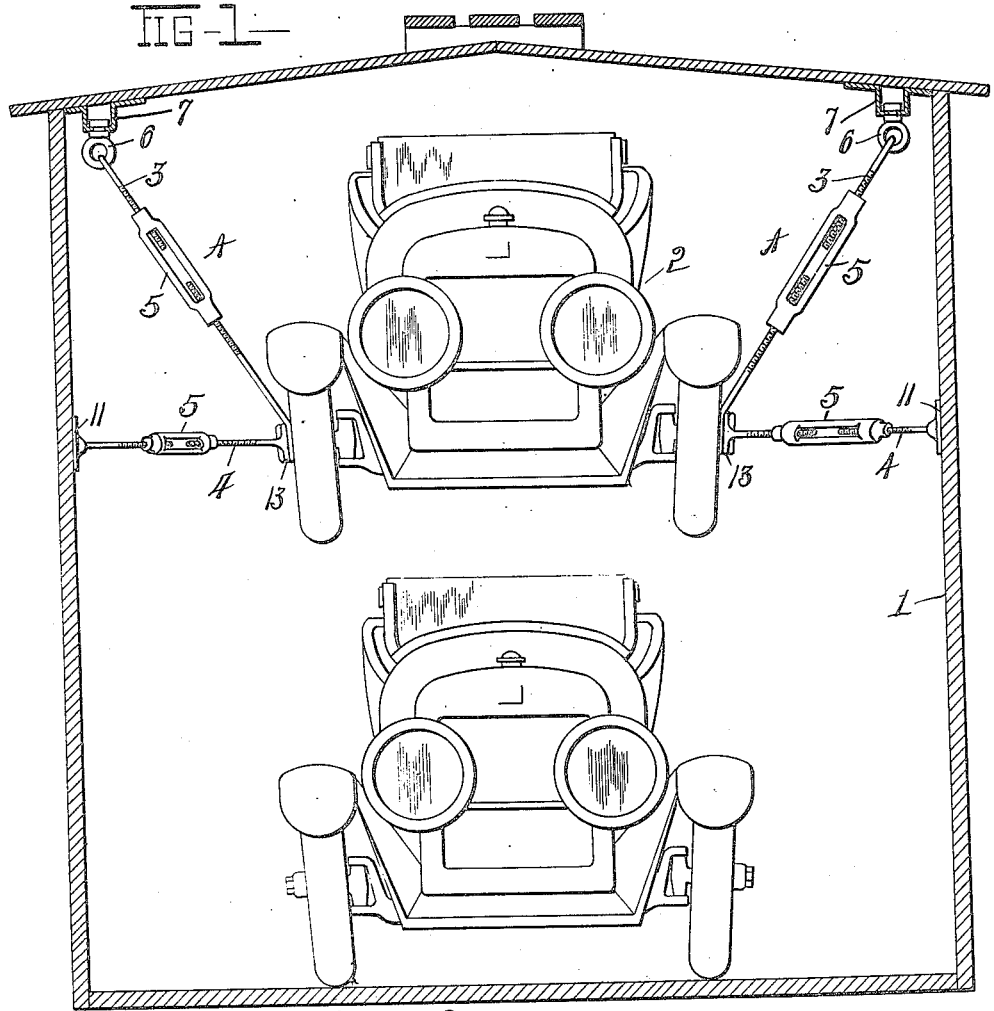
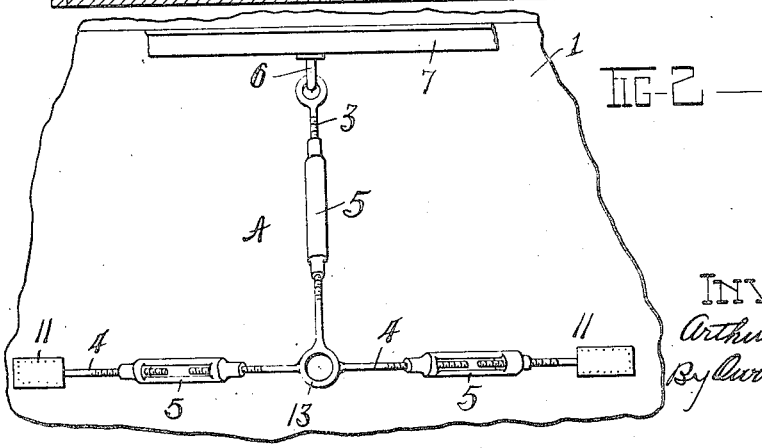
INVENTOR
Arthur G. Girard.
By Owen Owen & Crampton,
Attys.

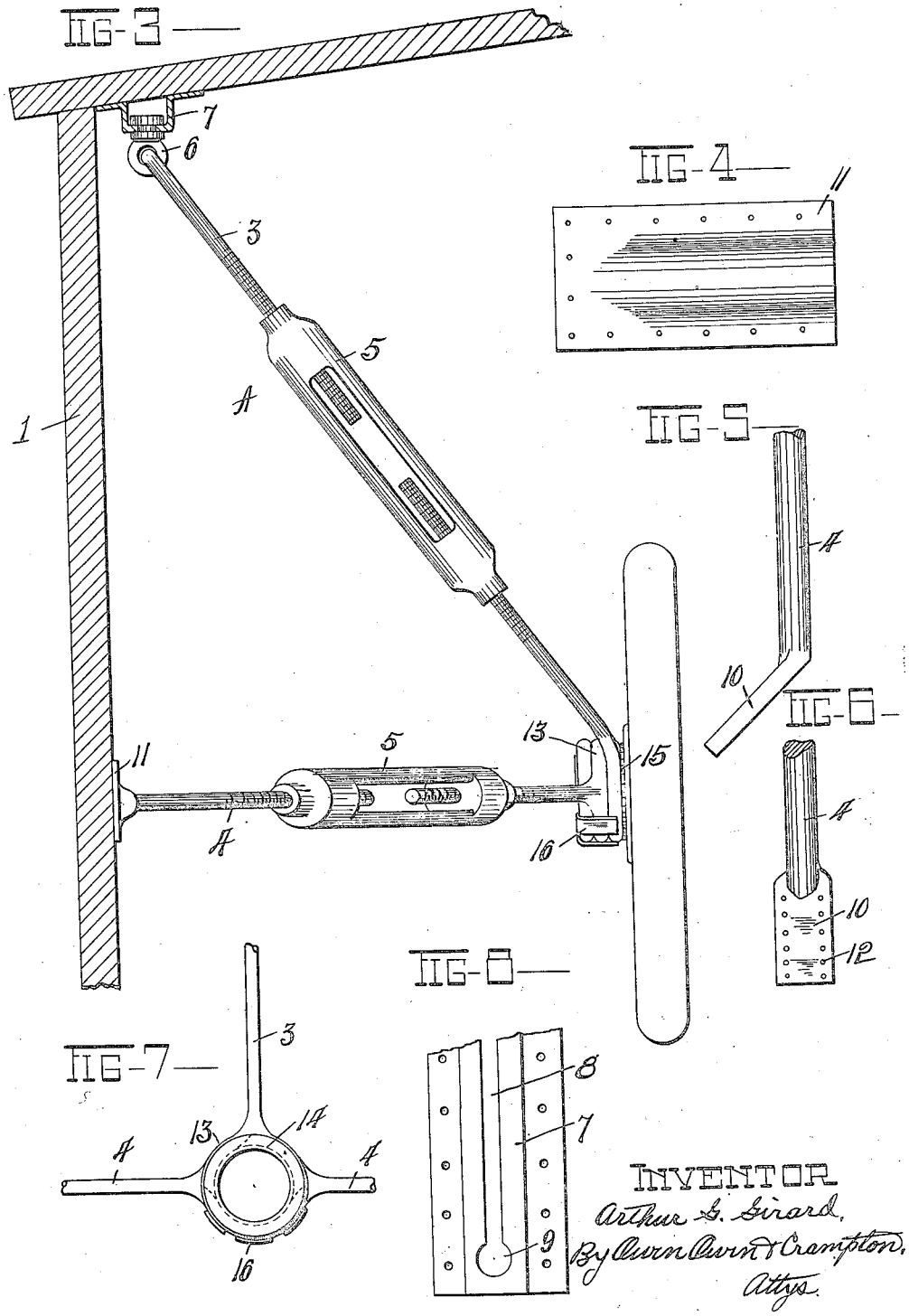

A. G. GIRARD.
ADJUSTABLE SUSPENDING RIG FOR AUTOMOBILES.
APPLICATION FILED MAR. 13, 1922.
1,416,191.
Patented May 16, 1922.
3 SHEETS—SHEET 3.
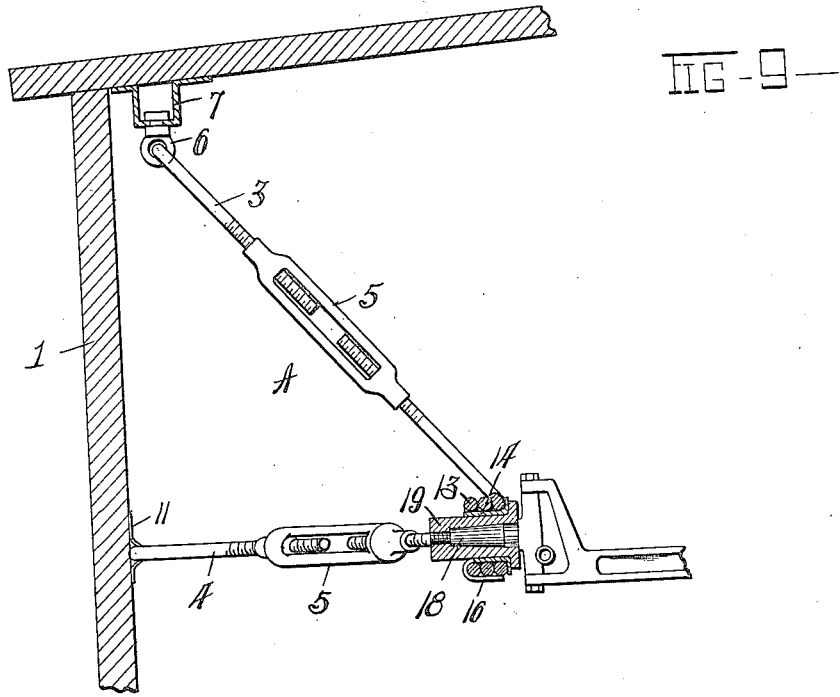
FIG-9-
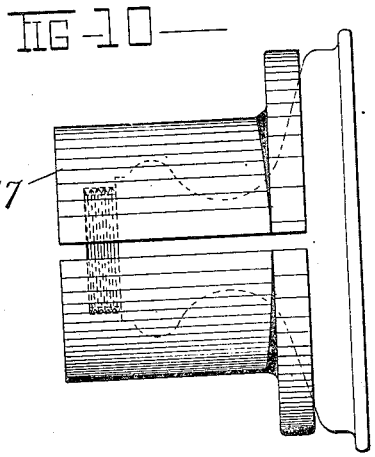
FIG-10-
INVENTOR
Arthur G. Girard.
By Owen Owen & Crampton.
Attys.

UNITED STATES PATENT OFFICE.

ARTHUR G. GIRARD, OF TOLEDO, OHIO.

ADJUSTABLE SUSPENDING RIG FOR AUTOMOBILES.

1,416,191.

Specification of Letters Patent. Patented May 16, 1922.

Application filed March 13, 1922. Serial No. 543,318.

*To all whom it may concern:*

Be it known that I, ARTHUR G. GIRARD, a citizen of the United States, and a resident of Toledo, in the county of Lucas and State of Ohio, have made an Invention Appertaining to an Adjustable Suspending Rig for Automobiles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to means particularly for use in freight cars for suspending automobiles therein during shipment, but may be used in other connections, as for instance, for suspending automobiles during storage in garages or other buildings.

The object of the invention is the provision of simple and efficient means of this character which is inexpensive in its construction, adjustable to suit automobiles of different length wheel bases, and is capable of being easily connected to the automobile and to rigidly hold the same in suspended position.

Further objects and advantages of the invention will be apparent from the following detailed description.

While the invention in its broader aspect is capable of embodiment in numerous forms, a preferred embodiment thereof is illustrated in the accompanying drawings, in which,—

Figure 1 is a vertical cross-section of the body portion of a box car with an automobile suspended therein over another automobile by a rig embodying the invention. Fig. 2 is an interior fragmentary view of the car and one of the units of a suspending rig in operative position. Fig. 3 is an enlarged fragmentary vertical cross-section of the car with one of the units of the suspending rig and an engaged automobile wheel. Fig. 4 is a view of one of the foot plates of the suspending rig. Figs. 5 and 6 are different fragmentary views of one of the side bracing rods of the rig. Fig. 7 is an enlarged view of the wheel hub or spindle engaging portion of a suspending rig unit. Fig. 8 is a fragmentary view of a side plate from which the upright member of a rig unit is adjustably suspended. Fig. 9 is a view similar to Fig. 3 with a rig unit partly in section and attached to a wheel spindle, and Fig. 10 is an enlarged view of a portion of a wheel hub and split adapter member engaged therewith.

Referring to the drawings, 1 designates the body of a box car, and 2 an automobile suspended therein.

The automobile suspending means embodying the invention comprises four bracing and suspending units A, one for each wheel or axle of the automobile and secured within the upper portion of the car body at the respective side thereof. Each unit A comprises a suspending rod 3 and two oppositely projecting substantially horizontally disposed bracing rods 4, each rod of a set being preferably of sectional form with the sections thereof connected by a turnbuckle 5 to facilitate adjustment of the respective rods as to length. The suspending or upright rod 3 is swingingly attached at its upper end to an eye bolt or stud member 6, which is carried for free longitudinal adjustment by a channeled plate 7 secured to the under side of the car roof adjacent to the side of the car with which the suspending unit is associated. The plate 7 is provided in the bottom of its channel with a longitudinally extending slot 8 through which the stud is suspended for sliding movements longitudinally of the slot and the slot at one end is provided with an enlargement 9 through which the stud 6 may be inserted or removed.

Each side bracing rod 4 is provided at its outer end with a foot 10, which is inclined with respect to the rod axis and may be removably inserted within a socket formed by a plate 11 secured to the inner side of the respective car side, or, if desired, the foot 10 may be secured to the car side by nails, screws, or the like, and for such purpose may be provided with apertures 12.

The free ends of the rods 3 and 4 of a unit are intended to terminate in adjacent position and each is provided with an eye 13 for receiving a wheel hub or spindle engaging sleeve 14 so that the eyes of all three rods of a unit are mounted on a single sleeve 14. This sleeve is preferably provided at its inner end, with respect to an engaged hub or spindle, with an outwardly projecting radial flange 15 and at its opposite end with bendable fingers 16 which may be bent around the eyelet rings 13 in holding engagement therewith. In mounting the members of a unit in assembled position, it will be understood that the upright member 3 preferably extends downward on an incline toward the center of the car to sleeve engaging position, and that the side bracing members 4 extend laterally in opposite directions from the sleeve, in diverging relation, to the adjacent side of the car with which their outer ends are engaged. It is thus evident that the rod 3 acts as the suspending member of a unit and the rods 4 as the bracing members thereof.

If the sleeve 14 is to be mounted on the hub of a wheel it is usually necessary to first mount an adapter on the hub which fits the particular hub with which it is intended to engage and forms an outer cylindrical surface on which the sleeve 14 is mounted. The adapter preferably comprises two semi-cylindrical block members 17, which are fashioned on their inner sides to fit the hub and are held together on the hub by the sleeve 14. It is usually necessary to remove the hub cap before placing the blocks 17 in engagement therewith. If the automobile is supported from the wheel carrying spindle 18 thereof, as shown in Fig. 9, an adapter sleeve 19 is mounted directly on the axle spindle in threaded engagement with the outer threaded end thereof, and the sleeve 14 is then mounted on the adapter sleeve. If an automobile is provided with wire wheels it is usually necessary, or at least preferable, to remove the wheels and engage the suspending units with the axle spindle.

In practice the plates 7 are preferably permanently attached to a car, the slots therein being of sufficient length to permit adjustment of the suspending rods 3 of the respective units a sufficient extent lengthwise of the car to suit the wheel base of the automobile to be suspended. The side bracing rods 5 are, however, preferably secured to the side walls of the car in a temporary manner as the positions of attaching the same to the side walls change for automobiles of different length wheel bases. It is evident that opposed suspending units cooperate to suspend an automobile the desired height in a car and also brace it against both longitudinal and transverse movements so that the automobile is vertically held in suspended position. By suspending automobiles within a car in this manner the car floor is left clear for the loading and storing of additional automobiles, thus enabling a car to carry a greater number of automobiles than would be the case where they are only mounted on the floor.

I wish it understood that my invention is not limited to any specific construction, arrangement or form of the parts, as it is capable of embodiment in numerous forms without departing from the spirit of the claims.

Having thus described my invention, what I claim as new and desire to secure by Letters Patent, is,—

1. In a suspending means of the class described, a unit comprising a suspending member and lateral bracing members adapted for engagement at their free ends to an article to be suspended.

2. A suspending rig of the class described having longitudinally adjustable suspending and bracing rods adapted to engage at their free ends an article to be suspended.

3. In a suspending rig of the class described, a unit having suspending and lateral bracing members terminating at their free ends in axially aligned sleeve embracing eyes, and an article engaging sleeve for entering the eyes of the members.

4. The combination with a structure having top and side members, of an automobile suspending rig having a suspending and bracing unit for each wheel of an automobile, each unit comprising a suspending rod extending downward from the top member and side bracing rods extending in converging relation from the adjacent side, the rods terminating in adjacent position at their free ends, and a wheel hub engaging member engaged to the free ends of the rods.

5. The combination with a structure of a rig for suspending an automobile therein, said rig comprising a unit for each wheel of the automobile, and each unit including suspending and lateral bracing members engaged to the structure and cooperating at their free ends to engage and hold the hub of the respective wheel.

6. The combination with a structure of an automobile suspending rig having a suspending member for each wheel hub adjustably suspended from the structure, and a set of lateral bracing members projecting from each hub and in coaction at their outer ends with the structure.

7. In combination, a box car body, a plurality of suspending members suspended from the upper portion of the car body for adjustment lengthwise thereof, a pair of lateral bracing memebrs for each suspending member and attached to and extending inward in converging relation from the adjacent side wall of the car body and terminating at their inner ends adjacent to the lower end of the suspending member, and means cooperating with each set of suspending and bracing members to engage part of an article to be supported.

8. In combination, a box car body, a set of four plates secured to the upper portion of the body, a suspending member depending from each plate for adjustment lengthwise thereof, a pair of bracing members for each suspending member and extending inward in converging relation from the adjacent side wall of the car body, the members of each set terminating at their free ends in adjacent relation and having axially registering eyes at such end, and an article embracing sleeve fitting within the eyes of the members of each set, the several sets of members and sleeves cooperating to support an article in rigid suspended relation with the car body.

9. In combination, a structure, a set of article suspending and bracing units therein, each set comprising an upright suspending member and laterally projecting side bracing members terminating at their free ends in adjacent relation and having axially registering eyes at such ends, adapter means for engagement with a part of an article to be suspended, and a sleeve mounted on the adapter means and entering the eyes of the adjacent set of suspending and bracing members.

In testimony whereof I have hereunto subscribed my name to this specification.

ARTHUR G. GIRARD.